No. 764,773.	Patented July 12, 1904.

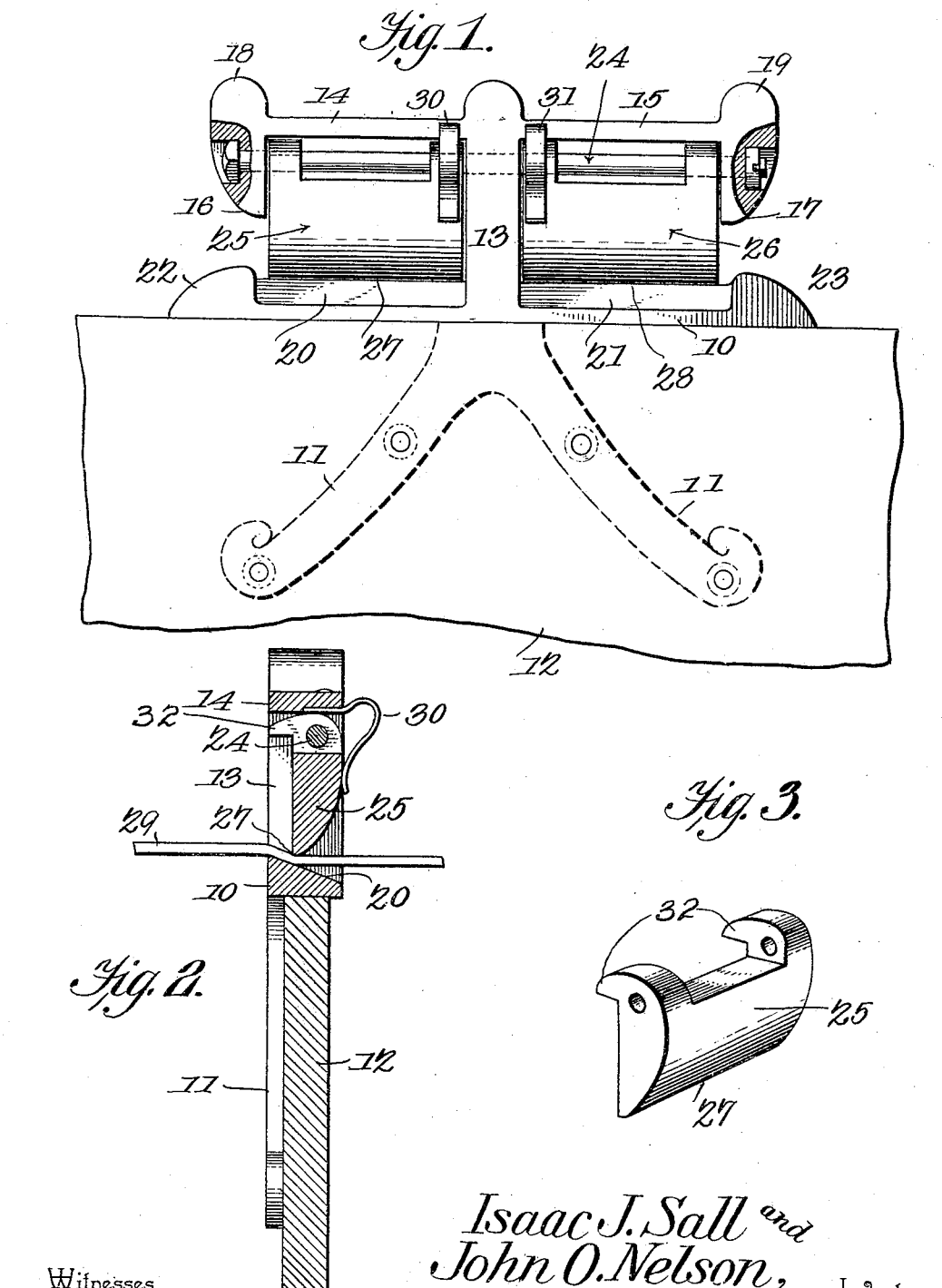

UNITED STATES PATENT OFFICE.

ISAAC J. SALL, OF DEERWOOD, AND JOHN O. NELSON, OF AITKIN, MINNESOTA.

REIN-HOLDER.

SPECIFICATION forming part of Letters Patent No. 764,773, dated July 12, 1904.

Application filed February 29, 1904. Serial No. 195,908. (No model.)

*To all whom it may concern:*

Be it known that we, ISAAC J. SALL, a citizen of the United States, residing at Deerwood, in the county of Crow Wing, and JOHN O. NELSON, a subject of the King of Sweden and Norway, residing at Aitkin, in the county of Aitkin, State of Minnesota, have invented a new and useful Rein-Holder, of which the following is a specification.

This invention relates to devices for attachment to vehicles and implements of various kinds drawn by horses for the purpose of holding the driving-reins while the driver is temporarily absent, and has for its object to simplify and improve the construction and produce a device of this character which may be attached to any of the various forms of vehicles or agricultural and other similar apparatus or vehicles drawn by horses and whereby the reins may be securely fastened to the holding device in position to be instantly released and which can also be utilized to support the reins while driving.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is an elevation viewed from the driver's seat or position, and Fig. 2 is a transverse section on the line 2 2 of Fig. 1. Fig. 3 is a perspective view of one of the cam-tongues detached.

The improved device consists of a base portion 10, having means, such as prongs 11, for attaching it to a dashboard (indicated at 12) or to any other suitable portion of a vehicle, the attaching means being varied to any desired extent to adapt the device to the different forms of vehicle or apparatus to which it is to be applied.

Rising centrally from the base portion 10 is a standard 13, from which arms 14 15 extend laterally in opposite directions parallel to and spaced from the base member and likewise spaced below the upper end of the standard, so that said upper end projects above the arms and forms a division-lug between them. At their outer ends the arms 14 15 are extended downwardly, as at 16 17, with their terminals spaced from the base member, leaving cavities for the insertion of the reins, as hereinafter shown, and at their outer ends arms 14 15 are also extended upwardly, as at 18 19, to form stops to limit the outward movement of the reins. The upper surfaces of the arms 14 15 serve as rests for the reins while driving, and the projections 18 19 and the central projection formed by the upwardly-extended end of the standard 13 confine the reins and prevent lateral displacement.

Formed in the upper surface of the base 10 beneath the arms 14 15 are transverse recesses 20 21, inclined obliquely to the transverse plane of the base portion, and the extremities 22 23 of the base portion are inclined as shown to form guides to conduct the reins into the recesses.

Mounted to swing on a rod 24, passing through the depending ends 16 17 and the central standard 13, are cam-tongues 25 26, with their free edges 27 28 contiguous to the inclined surfaces of the recesses 20 21 and serving to compress the reins (represented at 29) upon the inclined surfaces of the recesses.

By this simple arrangement it will be obvious that when the driver desires to fasten the reins when leaving the horse or horses temporarily he can do so by simply drawing their inner edges against the outer sides of the cam-tongues and move them rearwardly and thrust the reins beneath them and then release them, when the forward pull will instantly cause the cam-tongues to tightly "pinch" the reins upon the inclined surfaces of the recesses and securely hold them in place, and the greater the strain the greater will be the "grip," as will be obvious. By providing two independent tongues 25 26 one of the reins may be connected to each tongue. Relatively light holding-springs 30 31 will be connected in recesses in the under sides of the arms 14 15 for bearing upon the tongues and holding them yieldably in operative position to insure their positive action. The springs should possess as little strength as possible to prevent their interference with the free rearward action of the tongues when engaged by the reins when inserting the same. The cam-tongues will be provided with stop-lugs 32 to limit their movement in one direction and prevent them from swinging entirely through the framework of the device.

The frame comprising the base, standard, and tongue-supporting arms, together with the holding means 11, will preferably be of one single casting of malleable iron or steel, and the cam-tongues will likewise be of cast metal and may be of any desired size or strength and may be plated, japanned, or otherwise protected or ornamented.

Having thus described our invention, we claim—

1. A rein-holder comprising an attaching-base, a standard rising from the base, a substantially horizontal arm carried by the standard and alined above the base, said arm constituting a rein-guide and provided with spaced upstanding projections forming guards to prevent lateral displacement of the reins from the arm, and a cam loosely hung from the arm with its lower free end in coöperative relation with the upper face of the base, there being a space between the outer end of the arm and the base to permit of the reins being engaged between the cam and the base.

2. A rein-holder comprising an attaching-base, a standard rising therefrom, a substantially horizontal arm carried by the standard and alined above the base, the top of said arm constituting a rein-guide and also provided with spaced upstanding projections forming guards to prevent lateral displacement of the reins from the arm, and a cam loosely hung from the arm with its free lower end in coöperative relation with the base and provided at its upper end with a stop projection for engagement with the arm to limit the movement of the cam.

3. A rein-holder comprising an attaching-base, a standard rising therefrom, a substantially horizontal arm carried by the standard and alined above the base, the upper face of said arm constituting a rein-guide and provided with spaced upstanding projections forming guards to prevent lateral displacement of the reins from the arm, the outer end of the arm having a pendent projection, a pivot-pin supported upon the standard and the pendent projection, and a cam loosely hung upon the pivot with its lower free end in coöperative relation with the base, there being a space between the pendent projection and the base to permit of reins being engaged between the cam and the base.

4. A rein-holder comprising an attaching-base, a standard rising intermediately from the base, an arm carried by the standard and projected at opposite sides thereof in vertical alinement with the base, an intermediate and opposite terminal projections rising from the arm to constitute rein-guards, terminal pendent projections upon the arm, a pin piercing the pendent projections and the standard, and independent cams pivotally hung from the pin at opposite sides of the standard with their lower free ends in coöperative relation with the base, there being spaces between the pendent projections and the base to permit of reins being engaged between the cams and the base.

In testimony that we claim the foregoing as our own we have hereto affixed our signatures in the presence of two witnesses.

ISAAC J. SALL.
JOHN O. NELSON.

Witnesses:
JAMES P. SHAUGHNESSY,
BENJAMIN F. LIEBERMAN.